United States Patent
Hascher et al.

(10) Patent No.: US 10,226,902 B2
(45) Date of Patent: Mar. 12, 2019

(54) FLOW MEDIUM

(71) Applicant: BONAR B.V., Arnhem (NL)

(72) Inventors: Lori Curtiss Hascher, Asheville, NC (US); James Emory Mathis, II, Canton, NC (US); Jeffrey Scott Denton, Canton, NC (US)

(73) Assignee: LOW & BONAR B.V., Arnhem (NL)

( * ) Notice: Subject to any disclaimer, the term of this patent is extended or adjusted under 35 U.S.C. 154(b) by 827 days.

(21) Appl. No.: 14/361,526

(22) PCT Filed: Dec. 11, 2012

(86) PCT No.: PCT/EP2012/075023
§ 371 (c)(1),
(2) Date: May 29, 2014

(87) PCT Pub. No.: WO2013/087599
PCT Pub. Date: Jun. 20, 2013

(65) Prior Publication Data
US 2014/0287086 A1    Sep. 25, 2014

(30) Foreign Application Priority Data

Dec. 13, 2011 (EP) ..................................... 11193272

(51) Int. Cl.
| *B29C 70/28* | (2006.01) |
| *B29C 70/02* | (2006.01) |
| *B29C 70/44* | (2006.01) |
| *B29C 70/54* | (2006.01) |
| *A01G 25/02* | (2006.01) |
| *F24D 3/14*  | (2006.01) |

(52) U.S. Cl.
CPC ............ *B29C 70/028* (2013.01); *A01G 25/02* (2013.01); *B29C 70/443* (2013.01); *B29C 70/546* (2013.01); *F24D 3/14* (2013.01); *Y02B 30/24* (2013.01)

(58) Field of Classification Search
CPC ... B29C 70/028; B29C 70/443; B29C 70/546; A01G 25/02; F24D 3/14
USPC .............. 428/36.1–36.4, 196–197, 219–220, 428/292.1–301.4; 442/304–319, 327–417, 442/400–409
See application file for complete search history.

(56) References Cited

U.S. PATENT DOCUMENTS

| 6,881,375 | B2 * | 4/2005  | Topolkaraev ............. D01F 8/06 156/167 |
| 7,931,458 | B2   | 4/2011  | Lippert et al. |
| 2003/0148090 | A1 | 8/2003 | Lewit et al. |
| 2003/0211194 | A1 | 11/2003 | Louderback et al. |
| 2008/0079193 | A1 | 4/2008 | Hanks et al. |

FOREIGN PATENT DOCUMENTS

| DE | 102 03 975 C1 | 1/2003 |
| EP | 2 374 605 A1 | 10/2011 |
| WO | WO 2007/098769 A1 | 9/2007 |
| WO | WO 2009/020830 A1 | 2/2009 |
| WO | WO 2009/115878 A1 | 9/2009 |

OTHER PUBLICATIONS

Hoebergen; "Vacuum Infusion;" *ASM Handbook—Composites*; Dec. 2001; pp. 501-516; vol. 21; ASM International; Material Park, Ohio.
International Search Report dated Sep. 5, 2013 from International Application No. PCT/EP2012/075023.
International Preliminary Report on Patentability dated Apr. 16, 2014 from International Application No. PCT/EP2012/075023.

* cited by examiner

*Primary Examiner* — Joseph S Del Sole
*Assistant Examiner* — John Robitaille
(74) *Attorney, Agent, or Firm* — Oliff PLC

(57) ABSTRACT

A flow medium for distributing a resin in vacuum assisted resin transfer molding processes for manufacturing long, thick and more complex composite parts comprises a flow channel encapsulated by a layer of fibrous material, which provides a high volume flow of resin distributed in a timely manner in the mold.

18 Claims, No Drawings

FLOW MEDIUM

This application is a U.S. national phase application of PCT/EP2012/075023 filed on Dec. 11, 2012, and claims priority to EP 11193272.9 filed on Dec. 13, 2011. Each of these prior applications is incorporated herein by reference in its entirety.

BACKGROUND

The invention pertains to a flow medium for distributing a resin in resin transfer molding processes.

Vacuum assisted resin transfer molding (VARTM) is a process for manufacturing composite structures using a hard surface mold and a thin flexible membrane that enclose the components of the composite structure. One or more fiber reinforcement layers, for example of glass, carbon and/or aramid fibers, are layered in the hard surface mold and a thin flexible membrane or a second matching hard surface mold is put on top of the fiber reinforcement layers to close off the fiber reinforcement layers from the surrounding atmosphere. In addition, one or more core layers may be included in the fiber reinforcement layers, such as for example closed-cell foam, balsa or sealed honeycomb layers. A vacuum is applied through the membrane or mold to help draw resin into the sealed mold and the resin infiltrates into the fiber reinforcement layers. When the resin is cured, the composite structure can be removed from the mold.

In the VARTM process, the resin remains in a closed system and the chance for volatile off-gassing is minimized. By comparison, an open mold (spray up) process is open to the surrounding atmosphere and resin is delivered to the components directly.

In a closed molding system, speed and volume of resin delivery is critical to efficient and effective molding of composite structures. Resins generally have a limited pot life and the quality of the composite structure can suffer from poor quality resin when long times are needed to fill the mold with resin. The resin generally contains activating agents to initiate curing of the resin as the resin flows into the mold and infiltrates the fiber reinforcement layers. There is a delicate balance between curing the resin as quickly as possible to increase productivity and the ability to deliver the resin to the desired areas in the desired volume and before curing of the resin has progressed too far, which limits the flow of the (partially) cured resin.

As composite parts become longer, thicker and more complex, traditional means of resin delivery are not sufficient for delivery of the required resin volume in a timely manner. Wind blades, for example, are becoming larger and longer, and the ability to deliver resin quickly along the entire length of a blade mold is highly desirable. Ship hulls are becoming a more complex mixture of thick and thin areas providing increased challenges for the producer to supply the desired resin volume to the thick and thin areas.

A flow medium can be applied between the fiber reinforcement layers and the thin flexible membrane to improve the resin distribution in the mold in the VARTM process.

US 2003/0211194 applies a high permeability layer to yield an optimum flow front, the high permeability layer being either a felt-like material or a rubber or plastic fluid-impervious layer with non-directional protrusions on the side facing the fiber reinforcement layers. Such felt-like material or rubber or plastic fluid-impervious layer with non-directional protrusions do not provide sufficiently fast resin delivery in large composite parts.

US 2003/0148090 applies a flow channel medium for the passage of resin, the flow channel medium being a plastic mesh with large open volume. Such a plastic mesh with large open volume does not provide sufficient volume flow of resin in long composite parts.

WO 2007/098769 A1 discloses the use of inlet channels between a layer of fibrous material and a vacuum bag in a vacuum infusion process. The layer of fibrous material acts as flow medium, but does not always provide sufficiently fast resin delivery in large composite parts.

WO 2009/115878 discloses an autoclave method for producing fiber composite components wherein a sprue profile rests on a flat flow promotor comprising a woven fabric or knitted fabric. The flat flow promotor acts as flow medium, but does not always provide sufficiently fast resin delivery in large composite parts.

DE 10203975 C1 discloses a process for injection molding of fiber composites wherein an inlet channel is placed on top of a distribution fabric. The distribution fabric acts as flow medium, but does not always provide sufficiently fast resin delivery.

Hoebergen et al. disclose in Composites—Vacuum Infusion (ASM Handbook—Composites, pages 501-511, ISBN 978-0-87170-703-1) a process for vacuum infusion wherein resin distribution channels are placed directly on the fiber reinforcement layer or on a flow layer such as a nonwoven, a coarse weave or welded net. The flow layer acts as flow medium, but does not always provide sufficiently fast resin delivery, especially in large composite parts.

EP 2374605 A1 discloses an elastomeric resin flow channel placed on a mold surface, the flow channel being covered a fibrous layer, which in turn in covered by a membrane. The flow channel is placed directly on the fiber reinforcement layer. The fibrous layer is designed to provide a bondable surface for releasably bonding a reusable membrane on the top and side surfaces of the flow channel. The flow channel does not always provide optimal distribution of resin over the surface to be impregnated.

US 2008/0079193 A1 discloses the use of a resin distribution tube above and away from the preform to avoid direct contact of the resin distribution tube to the preform in order to eliminate deformations on the resin infused composite parts. By placing the resin distribution tube above and away from the preform, the speed of delivery and distribution of resin to the fiber reinforcement layer is not optimal.

SUMMARY

It is an object of the present invention to provide resin flow media providing faster resin delivery and/or improved resin distribution in vacuum assisted resin transfer molding processes.

The object of the invention is achieved by a flow medium comprising at least one flow channel, at least one layer of fibrous material, wherein the at least one flow channel is spatially confined in the layer of fibrous material.

DETAILED DESCRIPTION

A flow medium is to be understood to mean a layer which allows a higher flow speed for resin than the fiber reinforcement layers do.

The flow medium enables high volume flow of resin through the flow medium. As the composite structures to be produced become larger and longer, higher volumes of resin have to be distributed along the length of the mold.

The flow medium enables a higher speed of resin delivery as the flow channel has an open cross section, i.e., there are no obstacles inside in the flow channel reducing the flow speed of the resin inside the flow channel.

The flow medium may comprise at least one flow channel having non-porous wall(s) to enable optimization of the resin distribution throughout the mold. The non-porous flow channel promotes resin flow in the longitudinal direction of the flow channel.

The flow medium may comprise at least one porous flow channel to enable optimization of the resin distribution throughout the mold. The porous flow channel promotes resin flow in the longitudinal direction of the porous flow channel. Part of the resin is distributed through the porous wall of the flow channel. The layer of fibrous material encapsulating the porous flow channel enables distribution of resin in directions other than the longitudinal direction of the porous flow channel, such as for example perpendicular to the longitudinal direction of the porous flow channel.

The flow medium allows processing of resins having a higher viscosity.

The number and distribution of porous flow channels and/or flow channels having non-porous wall(s) in the flow medium can be varied to optimize the delivery and distribution of resin over the surface to be impregnated by the resin.

The flow channel(s), which is/are preferably a porous flow channel(s), may have any cross sectional shape to optimize the resin distribution through the mold. The cross sectional shape of a flow channel may for example be irregular, triangular, rectangular, pentagonal or round. The cross sectional shape of the flow channels is preferably round to minimize flow resistance in the flow channel.

The cross sectional area of a flow channel, which is preferably a porous flow channel, may vary widely depending on the volume flow of resin to be distributed through the mold. The cross sectional area of the flow channels may be in the range of 0.5 to 250 mm$^2$, preferably 1 to 200 mm$^2$, more preferably 10 to 175 mm$^2$, even more preferably 50 to 160 mm$^2$, most preferably 75 to 150 mm$^2$.

The cross sectional shape and/or cross sectional area of a flow channel, which is preferably a porous flow channel, may vary along the longitudinal direction of the flow channel to optimize the resin distribution in the mold.

The flow channel, which is preferably a porous flow channel, can be made from a wide variety of materials. The choice of material for a flow channel will generally depend on the compatibility with the type of resin used in the VARTM process, costs and/or availability. The flow channels may be made from a flexible material to accommodate for complex shapes of the composite structure to be produced. Preferably, the flow channels are made from a polyolefin polymer, more preferably from polypropylene or polyethylene.

The porous flow channel may be a perforated tube. The size distribution, number and/or spatial distribution of the perforations in a perforated tube in relation to the cross sectional area and/or shape of the perforated tube can be used to optimize the ratio of the amount of resin flowing in the longitudinal direction of the perforated tube and the amount of resin exiting the porous flow channel through the perforations in the perforated tube.

The size distribution of the perforations, the number of perforations and/or the spatial distribution of the perforations in a perforated tube may vary along the longitudinal direction of the perforated tube to optimize the resin distribution in the mold.

The porous flow channel may be a spiral tube. A spiral tube is a tube which has been cut in a helical manner. The helical cut may be made in a continuous or discontinuous manner.

The width of the helical cut and/or the pitch of the helical cut in a spiral tube in relation to the cross sectional area and/or shape of the spiral tube can be used to optimize the ratio of the amount of resin flowing in the longitudinal direction of the spiral tube and the amount of resin exiting the flow channel through the helical cut in the spiral tube.

The width and/or pitch of the helical cut in a spiral tube may vary along the longitudinal direction of the spiral tube to optimize the resin distribution in the mold.

When the helical cut is made in a discontinuous manner, the length of the cuts and/or the length of the non-cut sections of the helical cut can additionally be varied to optimize the ratio of the amount of resin flowing in the longitudinal direction of the spiral tube and the amount of resin exiting the flow channel through the helical cut in the spiral tube.

The length of the cuts and/or the length of the non-cut sections of the helical cut in the spiral tube may vary along the longitudinal direction of the spiral tube to optimize the resin distribution in the mold.

When the helical cut is made in a continuous manner, the spiral tube may additionally be elongated in the longitudinal direction of the spiral tube to widen the opening of the cut to increase the amount of resin exiting the flow channel through the helical cut in the spiral tube.

The flow medium may comprise more than one flow channel to increase the volume flow of resin and/or to optimize the resin distribution in the mold. Each flow channel is selected from a porous flow channel and a flow channel having non-porous wall(s). The properties as described above for each of the flow channels in the flow medium may vary independently from the other flow channels in the flow medium to optimize the delivery and distribution of resin in the mold.

The at least one layer of fibrous material of the flow medium enables that the resin exiting the porous flow channel through the porous wall is distributed further to the desired areas in the mold.

Handling and placing of individual flow channels, which are preferably porous flow channels, in a mold can be problematic and time consuming. Removal of individual flow channels from the mold after molding can be difficult. The flow medium having at least one layer of fibrous material encapsulating the flow channel(s) facilitates easier placement in and subsequent removal of the flow channel(s) from the mold.

When the layer of fibrous material of the flow medium faces the thin flexible membrane in a VARTM process, the membrane being put on top of the flow medium, the flow medium prevents puncture of the thin membrane, for example by the fibers of the fiber reinforcement layers, by the flow channel(s) or by an additional layer of flow medium.

The layer of fibrous material encapsulating the flow channel(s) prevents masking off of the porous wall(s) of the porous flow channels by the membrane upon application of the vacuum, thereby securing a higher resin flow exiting through the porous wall of the porous flow channel.

When the layer of fibrous material of the flow medium faces the fiber reinforcement layers in a VARTM process, the layer of fibrous material of the flow medium prevents an unwanted imprint of the flow channel(s).

The layer of fibrous material encapsulates the one or more flow channels, which is/are preferably porous flow channel(s), of the flow medium. The flow channel(s) is/are spatially confined in the layer of fibrous material. The layer of fibrous material encapsulating the flow channel(s) may additionally be physically attached to the flow channels by any known manner, such as for example by thermal bonding, mechanical bonding and/or adhesive bonding. The encapsulating layer of fibrous material prevents the porous flow channel(s) from being masked off by the membrane upon application of the vacuum, allowing the porous flow channels to fully function as a resin delivery and distribution device.

The encapsulation of the flow channel(s), which is/are preferably porous flow channel(s), by the layer of fibrous material enables easy placement and removal of the flow channel(s) in the mold.

When some or all of the porous flow channels in the flow medium are spiral tubes having a helical cut made in a continuous manner and are physically attached to the layer of fibrous material, the spiral tubes can be fixated at the desired degree of elongation in order to adjust the amount of resin exiting from the porous flow channels through the helical cut of the spiral tube.

Preferably, the layer of fibrous material of the flow medium encapsulating one or more flow channels, which is/are preferably porous flow channel(s), has at least the same thickness as the flow channel having the highest thickness of all the flow channels in the flow medium. Preferably, the thickness of the layer of fibrous material is at least 0.5 mm higher, more preferably at least 1 mm higher, even more preferably at least 1.5 mm higher, most preferably at least 2 mm higher, than the thickness of the flow channel having the highest thickness of all the flow channels in the flow medium.

The layer of fibrous material of the flow medium encapsulating the flow channel(s), which is/are preferably porous flow channel(s), may be any type of fibrous material, such as for example a woven, a nonwoven, such as for example a drylaid web of staple fibers or a spunbond nonwoven, a knitted fabric, or a three-dimensional entangled mat of extruded filaments.

Preferably, the layer of fibrous material encapsulating the flow channel(s) has two main surfaces, defined by the length and width of the flow medium, wherein the two main surfaces are oriented plane parallel to each other to facilitate easy handling and installation of the flow medium, such as for example during winding on and unwinding from a roll.

The layer of fibrous material encapsulating the flow channel(s), which is/are preferably porous flow channel(s), can be made from a wide variety of materials. The optimum choice of material for the layer of fibrous material will generally depend on the compatibility with the material of which the flow channels are made, the type of resin used in the VARTM process, costs and/or availability. Preferably, the layer of fibrous material is made from a polyolefin or a polyamide polymer, more preferably from polypropylene or polyamide 6.

Preferably, the layer of fibrous material of the flow medium is a three-dimensional entangled mat of extruded filaments, thermally bonded at their crossing points and having a high void volume to ensure high volume resin flow in directions other than the longitudinal direction of the flow channels, especially in directions perpendicular to the longitudinal direction of the flow channels and/or in the plane of the layer of fibrous material.

The void volume of the three-dimensional entangled mat of extruded filaments may be at least 50 vol. %, preferably at least 75 vol. %, more preferably at least 85 vol. %, even more preferably at least 90 vol. %, most preferably at least 95 vol. %.

The thickness of the filaments in the three-dimensional entangled mat of extruded filaments may be in the range of 0.1 to 2.5 mm, preferably in the range of 0.15 to 2.0 mm, more preferably in the range of 0.2 to 1.5 mm, even more preferably in the range of 0.25 to 1.2 mm, most preferably in the range of 0.25 to 0.75 mm.

The three-dimensional entangled mat of extruded filaments may be shaped in any desired three-dimensional form, such as for example in a series of hills and valleys either being spaced apart by a specified distance or abutted to each other and either being placed in parallel lines or in a staggered formation, or in a series of hemispheres either being spaced apart by a specified distance or abutted to each other and either being placed in parallel lines or in a staggered formation. The three-dimensional entangled mat of extruded filaments may comprise positive and/or negative cuspates, cups or waffles either being spaced apart by a specified distance or abutted to each other and either being placed in parallel lines or in a staggered formation. Alternatively, the three-dimensional entangled mat of extruded filaments may comprise a series of pyramids, either being spaced apart by a specified distance or abutted to each other and either being placed in parallel lines or in a staggered formation. The three-dimensional entangled mat of extruded filaments preferably comprises U- and/or V-grooves, preferably extending in machine direction and/or cross machine direction, which enables easy incorporation of the one or more flow channels, which is/are preferably porous flow channel(s), into the three-dimensional mat of extruded filaments. The three-dimensional entangled mat of extruded filaments may also comprise any combination of hills and valleys, hemispheres, positive and/or negative cuspates, cups or waffles, pyramids and/or U- and V-grooves.

Preferably, the three-dimensional form of the three-dimensional entangled mat of extruded filaments is such that the three-dimensional entangled mat of extruded filaments has two main surfaces, defined by the length and width of the flow medium, which are oriented plane parallel to each other. When the three-dimensional entangled mat of extruded filaments comprises a series of hills and valleys, the tops of the hills are located in the plane of the first main surface and the bases of the valleys are located in the plane of the second main surface. When the three-dimensional entangled mat of extruded filaments comprises a series of hemispheres, the tops of the hemispheres are located in the plane of the first main surface and the base surfaces of the hemispheres are located in the plane of the second main surface. When the three-dimensional entangled mat of extruded filaments comprises a series of pyramids, the tops of the pyramids are located in the plane of the first main surface and the base surfaces of the pyramids are located in the plane of the second main surface. When the three-dimensional entangled mat of extruded filaments comprises a U- and/or V-grooves, the tops of the U- and/or V-grooves are located in the plane of the first main surface and the base surfaces of the U- and/or V-grooves are located in the plane of the second main surface. When the three-dimensional entangled mat of extruded filaments comprises a cuspates, cups and/or waffles, the tops of the cuspates, cups or waffles are located in the plane of the first main surface and the base surfaces of the cuspates, cups or waffles are located in the plane of the second main surface.

Machine direction is to be understood as the direction in which the three-dimensional entangled mat of extruded filaments is produced, generally being defined by the largest dimension of the flow medium. The machine direction is also called the length of the flow medium. Cross machine direction is to be understood as the direction perpendicular to the machine direction in the plane of the main surface of the flow medium. The cross machine direction is also called the width of the flow medium.

The flow medium may comprise one or more additional layers. Each of the additional layers may be a film or a layer of fibrous material, such as a woven, a two-dimensional grid or scrim, a nonwoven or a three-dimensional entangled mat of extruded filaments.

Each of the additional layers may be physically attached to the at least one layer of fibrous material and/or another additional layer of the flow medium by any known manner, such as for example by thermal bonding, mechanical bonding and/or adhesive bonding.

An additional layer, attached to the at least one layer of fibrous material of the flow medium, may for example form a protective layer to prevent that fibers from the at least one layer of fibrous material puncture the thin flexible membrane in the VARTM process.

An additional layer may for example provide a smooth surface layer to prevent that fibers from the at least one layer of fibrous material or the flow channels, which is/are preferably porous flow channel(s), leave an unwanted imprint on the surface of the resin impregnated composite structure. Such an additional layer may be removable from the flow medium, i.e., releasably attached to the flow medium, to provide flexibility to the composite structure manufacturer who might not need the smooth surface layer for a particular mold and/or lay-up design.

An additional layer may extend past the edges of the flow medium to protect the thin flexible membrane from puncture from the edges of the flow medium and/or to retard the flow of resin out through the edges of the flow medium, promoting resin flow in the longitudinal direction of the composite part under construction.

An additional layer may for example provide increased strength and/or dimensional stability to the flow medium, which facilitates easier placement and subsequent removal of the flow medium in the mold.

The flow medium preferably has a thickness in the range of 1 to 20 mm, for example in order to enable sufficient flow of resin through the mold.

The flow medium has sufficient resistance against the compression forces of the VARTM process while providing sufficient free volume to provide high volume resin delivery at high resin flow rates.

The flow medium may exhibit a compressive force yield point above which the flow medium may collapse. When an increased vacuum is applied after completion of the resin transfer through the mold in the VARTM process, the flow medium may collapse due to increased compression forces and resin entrapped in the flow medium is forced out of the flow medium in essentially a flushing action, thus reducing the amount of retained, and subsequently wasted resin.

The further object of the invention is achieved by a vacuum assisted resin transfer molding process for manufacturing composite articles comprising the steps of supplying a hard surface mold, placing at least one fiber reinforcement layer in the hard surface mold, placing a membrane on top of the at least one fiber reinforcement layer to form a closed mold and applying a vacuum to draw resin into the closed mold wherein the inventive flow medium as described above is placed between the at least one fiber reinforcement layer and the membrane.

The VARTM process enables manufacture of composite articles at increased productivity as the inventive flow medium in the VARTM process provides high volume flow of resin and/or higher speed of resin delivery as the flow channel(s), which is/are preferably porous flow channel(s), has/have an open cross section through the mold thereby reducing the time required for distributing the resin in the mold.

The VARTM process enables manufacture of composite articles having improved quality as the inventive flow medium in the VARTM process enables optimization of the resin distribution in the mold. The flow channel(s), which is/are preferably porous flow channel(s), promote(s) resin flow in the longitudinal direction of the flow channel(s) and/or the porosity of the flow channel(s) can be adjusted to promote resin flow in directions other than the longitudinal direction of the channel(s).

In the VARTM process, higher viscosity resins can be processed as the inventive flow medium allows processing of resins having a higher viscosity.

The flow medium as described above may also be used in an irrigation system, such as for example to irrigate natural grass surfaces such as natural playing fields, to wet artificial turf surfaces or to irrigate green roofs. The flow medium enables optimized distribution of a fluid such as water, optionally comprising nutrients and/or insecticides, over the surface to be irrigated.

Preferably, the flow medium used as an irrigation system comprises one or more porous flow channels as described above. The layer of fibrous material encapsulating the porous flow channel(s) enables distribution of fluid in directions other than the longitudinal direction of the porous flow channel, such as for example perpendicular to the longitudinal direction of the porous flow channel.

The distribution of porous flow channels and/or flow channels having non-porous wall(s) in the flow medium may be optimized to distribute the water over the surface to be irrigated, especially for inclined surfaces. In addition, the cross sectional area of each one of the flow channels may be varied along the longitudinal direction of the flow channel to optimize the distribution of water over the surface to be irrigated.

When a porous flow channel is a perforated tube, the size distribution, number and/or spatial distribution of the perforations in a perforated tube in relation to the cross sectional area and/or shape of the perforated tube can additionally be used to optimize the ratio of the amount of water flowing in the longitudinal direction of the perforated tube and the amount of water exiting the porous flow channel through the perforations in the perforated tube.

When a porous flow channel is a spiral tube, the width of the helical cut and/or the pitch of the helical cut in a spiral tube in relation to the cross sectional area and/or shape of the spiral tube can likewise be used to optimize the ratio of the amount of water flowing in the longitudinal direction of the spiral tube and the amount of water exiting the flow channel through the helical cut in the spiral tube.

The flow medium having a layer of fibrous material encapsulating the flow channel(s) facilitates easier placement and removal of the flow channel(s) over the surface to be irrigated.

The flow medium as described above may also be used in a heating or cooling system, for example to regulate the temperature in a room or a building, for example by placing the flow medium in the wall(s) and/or floor of the room or building. Alternatively, the temperature in a room or a building can be regulated by placing the flow medium in the roof structure and/or on the roof of the building, for example beneath a green roof. The flow medium enables optimized distribution of a fluid, for example hot or cold water or a hot gaseous medium such as steam, throughout the surface to be heated or cooled.

Preferably, the flow medium used as a heating or cooling system comprises one or more flow channels having non-porous wall(s) to prevent damage to the construction of the walls, floor or roof.

The flow medium having a layer of fibrous material encapsulating the flow channel(s) facilitates easier placement and removal of the flow channel(s) in and/or on the surface to be heated or cooled. The flow medium makes the time consuming installation of individual flow channels in the surface to be heated or cooled, such as for example in a wall, redundant.

The flow channel can be made from a wide variety of materials. The choice of material for a flow channel will generally depend on the compatibility with the type of fluid used in order to heat or cool the surface, costs and/or availability. The flow channels may for example be made from a metal to withstand the pressure of a gaseous medium such as steam.

The flow channels may be made from a flexible material to accommodate for complex shapes of the surface to be heated or cooled. Preferably, the flow channels are made from a polyolefin polymer, more preferably from polypropylene or polyethylene.

The invention claimed is:

1. A flow medium for distributing a fluid comprising at least one flow channel and at least one layer of fibrous material, wherein the at least one flow channel is spatially confined in one layer of the at least one layer of fibrous material, wherein the one layer of fibrous material is a three-dimensional entangled mat of extruded filaments in which the extruded filaments are thermally bonded at their crossing points, and wherein the entangled mat of extruded filaments has a void volume of at least 50 vol. %, and wherein the extruded filaments have a thickness in a range of 0.25 mm to 1.2 mm.

2. The flow medium according to claim 1 wherein the at least one layer of fibrous material has two main surfaces, defined by the length and width of the flow medium, wherein the two main surfaces are oriented plane parallel to each other.

3. The flow medium according to claim 1 wherein the at least one flow channel is a porous flow channel.

4. The flow medium according to claim 3 wherein the at least one porous flow channel is a perforated tube.

5. The flow medium according to claim 3 wherein the at least one porous flow channel is a spiral tube.

6. The flow medium according to claim 1 wherein the at least one flow channel has non-porous wall(s).

7. The flow medium according to claim 1 wherein the flow channel has a cross sectional area in the range of 0.5 to 250 $mm^2$.

8. The flow medium according to claim 1 wherein the three-dimensional entangled mat of extruded filaments is shaped in a three-dimensional form comprising hills and valleys, hemispheres, positive and/or negative cuspates, cups and/or waffles, pyramids, U-grooves and/or V-grooves.

9. The flow medium according to claim 1 wherein the flow medium has a thickness of 1 to 20 mm.

10. The flow medium according to claim 1 wherein the flow medium comprises one or more additional layers, each of the additional layers being a film or a layer of fibrous material.

11. The flow medium according to claim 1 wherein the flow medium is used in vacuum assisted resin transfer molding processes.

12. The flow medium according to claim 1 wherein the flow medium is in an irrigation system.

13. The flow medium according to claim 1 wherein the flow medium is in a heating or cooling system.

14. The flow medium according to claim 1 wherein the flow channel has a cross sectional area in the range of 10 to 175 $mm^2$.

15. The flow medium according to claim 1 wherein the flow channel has a cross sectional area in the range of 75 to 150 $mm^2$.

16. The flow medium according to claim 1 wherein the three-dimensional entangled mat of extruded filaments has a void volume of at least 85 vol. %.

17. The flow medium according to claim 1 wherein the three-dimensional entangled mat of extruded filaments has a void volume of at least 95 vol. %.

18. The flow medium according to claim 10 wherein the film or the layer of fibrous material of each of the additional layers is a woven, a two-dimensional grid or scrim, a nonwoven or a three-dimensional entangled mat of extruded filaments.

* * * * *